US012625289B2

(12) United States Patent
AlShehri et al.

(10) Patent No.: US 12,625,289 B2
(45) Date of Patent: May 12, 2026

(54) DETERMINING WELL PRODUCTIVITY FOR HYDRAULICALLY FRACTURED WELLS

(71) Applicant: Saudi Arabian Oil Company, Dhahran (SA)

(72) Inventors: Abdallah A. AlShehri, Dhahran (SA); Klemens Katterbauer, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 586 days.

(21) Appl. No.: 18/109,553

(22) Filed: Feb. 14, 2023

(65) Prior Publication Data

US 2024/0272320 A1     Aug. 15, 2024

(51) Int. Cl.
| | |
|---|---|
| *G01V 1/18* | (2006.01) |
| *E21B 43/26* | (2006.01) |
| *E21B 47/07* | (2012.01) |
| *E21B 47/117* | (2012.01) |
| *E21B 49/00* | (2006.01) |

(52) U.S. Cl.
CPC .............. *G01V 1/181* (2013.01); *E21B 43/26* (2013.01); *E21B 47/117* (2020.05); *E21B 49/00* (2013.01); *E21B 47/07* (2020.05)

(58) Field of Classification Search
CPC ....... G01V 1/181; E21B 47/117; E21B 43/26; E21B 49/00; E21B 47/07
See application file for complete search history.

(56) References Cited

U.S. PATENT DOCUMENTS

| | | | | |
|---|---|---|---|---|
| 9,835,017 | B2 * | 12/2017 | Taylor .................... | G01V 1/42 |
| 2013/0087321 | A1 * | 4/2013 | Bartko ................ | E21B 41/0035 |
| | | | | 166/66 |

| | | | |
|---|---|---|---|
| 2013/0285477 | A1 | 10/2013 | Lo et al. |
| 2016/0230511 | A1 * | 8/2016 | Wang ........................ G01V 3/38 |
| 2016/0245065 | A1 * | 8/2016 | Gray ....................... G01V 1/306 |
| 2016/0326845 | A1 * | 11/2016 | Djikpesse .............. G06Q 50/02 |
| 2017/0108605 | A1 * | 4/2017 | Walters .................... G01V 1/42 |
| 2017/0299759 | A1 | 10/2017 | Schmidt et al. |
| 2018/0018561 | A1 | 1/2018 | Hassan et al. |

(Continued)

FOREIGN PATENT DOCUMENTS

| | | |
|---|---|---|
| WO | WO 2005119303 | 12/2005 |

OTHER PUBLICATIONS

Liu Wei, Forecasting oil production using ensemble empirical model decomposition based Long Short-Term Memory neural network , 2020, Journal of Petroleum Science and Engineering (Year: 2020).*

(Continued)

*Primary Examiner* — Catherine T. Rastovski
*Assistant Examiner* — Sharah Zaab
(74) *Attorney, Agent, or Firm* — Fish & Richardson P.C.

(57)     ABSTRACT

Methods and systems for determining well productivity include acquiring measurement data from a plurality of in-situ sensors located within a hydraulically fractured subterranean formation; classifying the noise degree for sensors of the plurality based on the acquired measurement data; selecting sensors from the plurality by minimizing noise degree while maintaining coverage of the subterranean formation above a user defined threshold; extracting data from the selected sensors; and estimating fracture half-length and well productivity potential based on the extracted data.

20 Claims, 10 Drawing Sheets

(56)                References Cited

U.S. PATENT DOCUMENTS

| | | | |
|---|---|---|---|
| 2020/0356856 A1* | 11/2020 | Moniruzzaman | ..... G06F 16/901 |
| 2021/0133990 A1 | 5/2021 | Eckart et al. | |
| 2021/0358205 A1 | 11/2021 | Laugier et al. | |
| 2021/0388714 A1 | 12/2021 | Katterbauer et al. | |

OTHER PUBLICATIONS

Abdullayeva et al., "Development of oil production forecasting method based on deep learning," Statistics, Optimization & Information Computing, Dec. 2019, 7(4):826-839, 14 pages.

Al-Shehri et al., "FracBot Technology for Mapping Hydraulic Fractures," Society of Petroleum Engineers, Oct. 2017, 17 pages.

Alyousuf et al., "Advances in Surface-Wave Analysis Using Single Sensor Seismic Data and Deep Neural Network Algorithm for Near Surface Characterization," presented at the Abu Dhabi International Petroleum Exhibition and Conference, Abu Dhabi, United Arab Emirates, Nov. 11-14, 2019, 9 pages.

Baig et al., "Do Hydraulic Fractures Induce Events Large Enough to be Felt on Surface?" CSEG Recorder, Oct. 2012, 5 pages.

Baig et al., "Utilizing Hybrid Surface—Downhole Seismic Networks to Monitor Hydraulic Fracture Stimulations," presented at the SPE Hydraulic Fracturing Technology Conference, The Woodlands, Texas, Feb. 4-6, 2013, 8 pages.

Bleakly, "Using Multi-Well Microseismicity to Identify Fracture Types Associated with Hydraulic Fracture Stimulations," CSEG Recorder, Sep. 2007, 4 pages.

Chaki et al., "Well Tops Guided Prediction of Reservoir Properties using Modular Neural Network Concept: A Case Study from Western Onshore, India," Indian Institute of Technology, 24 pages.

Fisher et al., "Hydraulic Fracture-Height Growth: Real Data," SPE Production & Operations, Feb. 2012, 12 pages.

He et al., "Spatio-temporal capsule-based reinforcement learning for mobility-on-demand network coordination," presented at The World Wide Web Conference, San Francisco, California, May 13-17, 2019, 2806-2813, 8 pages.

Kim et al., "Generation of synthetic density log data using deep learning algorithm at the golden field in Alberta, Canada," Geofluids, Jan. 2020, 2020:1-26, 26 pages.

King, "Hydraulic Fracturing 101: What Every Representative, Environmentalist, Regulator, Reporter, Investor, University Researcher, Neighbor and Engineer Should Know About Estimating Frac Risk and Improving Frac Performance in Unconventional Gas and Oil Wells," presented at the SPE Hydraulic Fracturing Technology Conference, The Woodlands, Texas, Feb. 6-8, 2012, 80 pages.

Korjani et al., "A new approach to reservoir characterization using deep learning neural networks," presented at the SPE Western Regional Meeting, Anchorage, Alaska, May 23-26, 2016, 15 pages.

Kumar et al., "Petrophysical evaluation of well log data and rock physics modeling for characterization of Eocene reservoir in Chandmari oil field of Assam-Arakan basin, India," Journal of Petroleum Exploration Production Technology, Jul. 2017, 8:323-340, 18 pages.

Le et al., "A Machine-Learning Framework for Automating Well-Log Depth Matching," Petrophysics, 2019, 60:585-595, 11 pages.

Martins and et al., "Novel mi-based (fracbot) sensor hardware design for monitoring hydraulic fractures and oil reservoirs," presented at the 8th IEEE Annual Ubiquitous Computing, Electronic Mobile Communication Conference, New York City, New York, Oct. 19-21, 2017, 8 pages.

Mohaghegh et al., "A Methodological Approach For Reservoir Heterogeneity Characterization Using Artificial Neural Networks," SPE 28394, presented at the SPE Annual Technical Conference & Exhibition held in New Orleans, LA, U.S.A., Sep. 25-28, 1994; Society of Petroleum Engineers, 1994, 5 pages.

Potocki, "Understanding Induced Fracture Complexity in Different Geological Settings Using DFIT Net Fracture Pressure," presented at the SPE Canadian Unconventional Resources Conference, Calgary, Western Canada, Canada, Oct. 30-Nov. 1, 2012, 19 pages.

Rafik et al., "Prediction of permeability and porosity from well log data using the nonparametric regression with multivariate analysis and neural network, Hassi R'Mel Field, Algeria, " Egyptian Journal of Petroleum, 2017, 26:763-778, 16 pages.

Saikia et al., "Artificial neural networks in the domain of reservoir characterization: a review from shallow to deep models," Computers & Geosciences, Nov. 2019, 135, 13 pages.

Salehi et al., "Estimation of the non-records logs from existing logs using artificial neural networks," Egyptian Journal of Petroleum, 2017, 26: 957-968, 12 pages.

Verma et al., "Porosity and Permeability Estimation using Neural Network Approach from Well Log Data," GeoConvention 2012: Vision, 2012, 6 pages.

Viegas et al., "Effective monitoring of reservoir-induced seismicity utilizing integrated surface and downhole seismic networks," First Break, Jul. 2012, 5 pages.

* cited by examiner

Controlled Borehole Source

Activated Sensor Vibrations

Controlled Borehole Source

148

150 — Hydraulic Fracturing

152 — Sensors Injection with Proppants

154 — Vibroseis Vibrations

156 — Sensors Activation

158 — Microseismic Detection and Recording

160 — Microseismic Events Mapping

Figure 5:
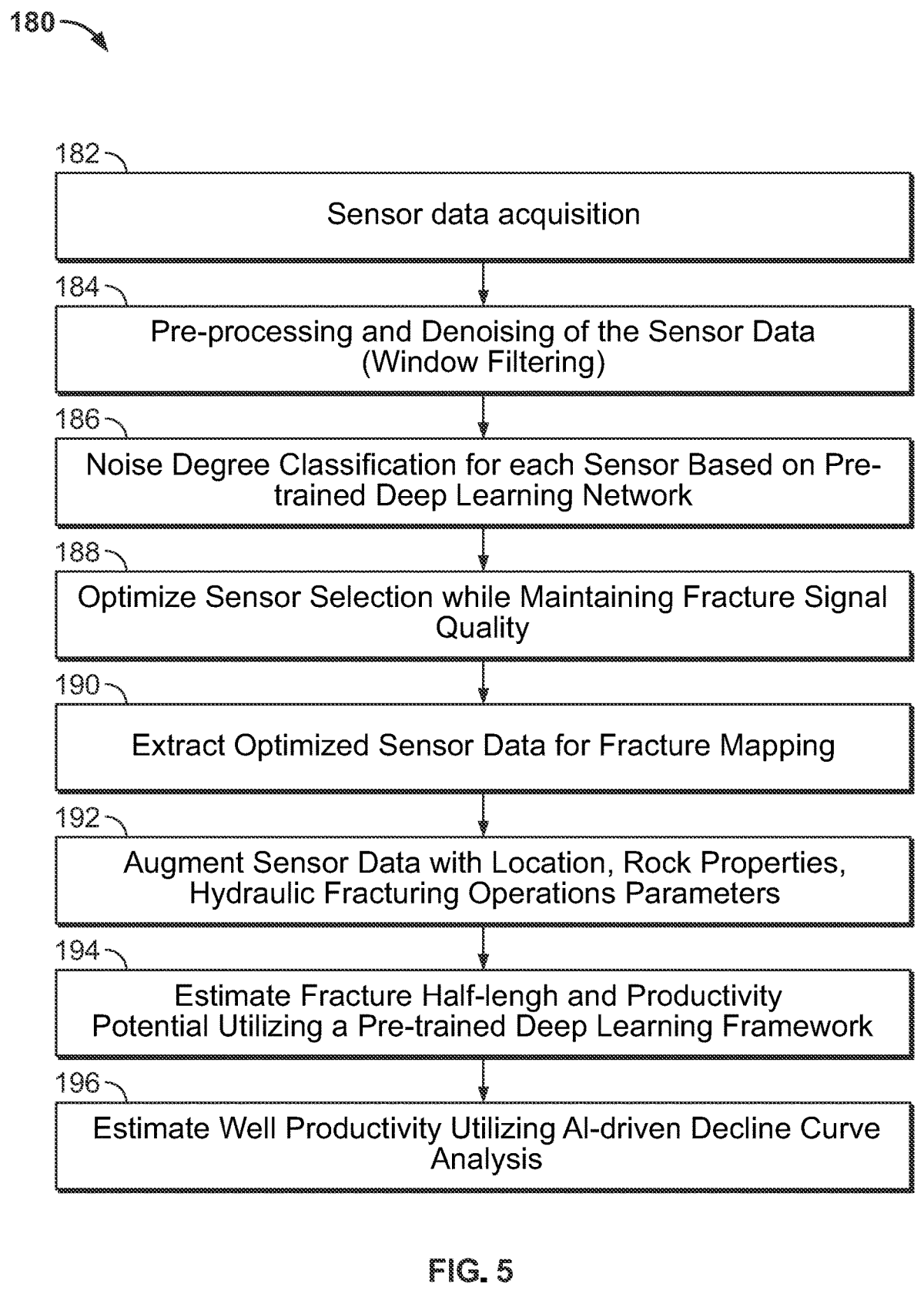

180

182

Sensor data acquisition

184

Pre-processing and Denoising of the Sensor Data
(Window Filtering)

186

Noise Degree Classification for each Sensor Based on Pre-
trained Deep Learning Network

188

Optimize Sensor Selection while Maintaining Fracture Signal
Quality

190

Extract Optimized Sensor Data for Fracture Mapping

192

Augment Sensor Data with Location, Rock Properties,
Hydraulic Fracturing Operations Parameters

194

Estimate Fracture Half-lengh and Productivity
Potential Utilizing a Pre-trained Deep Learning Framework

196

Estimate Well Productivity Utilizing AI-driven Decline Curve
Analysis

DETERMINING WELL PRODUCTIVITY FOR HYDRAULICALLY FRACTURED WELLS

TECHNICAL FIELD

The present disclosure generally relates to hydraulically fractured wells.

BACKGROUND

Hydraulic fracturing is a well completion operation used to crack reservoir formations via injection of high-pressure water to prepare the well for production and improve hydrocarbons flow to the wellbore especially from low permeability formations. Once a certain formation is fractured, proppants are pumped into these fractures to keep them open after dropping the fluid pressure.

Current methods of hydraulic fracturing monitoring, such as micro-seismic monitoring, employ a set of seismic sensors on the surface or in neighboring wellbores where signal noise can mask small magnitude seismic signals generated by fractures. Another setup employs seismic sensors in neighboring monitoring wells or laterals to reduce the effects of noise and improve signal-to-noise ratios; however, monitoring wells or laterals may not be available.

SUMMARY

This specification describes techniques for determining well productivity in hydraulically fractured wells. In-situ sensing devices of micrometer to millimeter size are pumped into fractures alongside proppants to monitor fracture extent and direction and to induce larger in-situ vibrations that can be better detected by seismic sensors. These devices can be energized by a vibration source from the surface or the borehole and then activated to vibrate and act as micro-seismic sources within the fractures. The data gathered from the sensors is integrated into a deep learning framework to determine the well productivity.

In one aspect a method for determining well productivity includes acquiring measurement data from a plurality of in-situ sensors located within a hydraulically fractured subterranean formation; classifying the noise degree for sensors of the plurality based on the acquired measurement data; selecting sensors from the plurality by minimizing noise degree while maintaining coverage of the subterranean formation above a user defined threshold; extracting data from the selected sensors; and estimating fracture half-length and well productivity potential based on the extracted data.

In one aspect, a system for estimating well productivity includes a plurality of in-situ sensors; a base station; at least one processor; and a memory storing instructions that when executed by the at least one processor cause the at least one processor to perform operations including acquiring measurement data from a plurality of in-situ sensors located within a hydraulically fractured subterranean formation; classifying the noise degree for sensors of the plurality based on the acquired measurement data; selecting sensors from the plurality by minimizing noise degree while maintaining coverage of the subterranean formation above a user defined threshold; extracting data from the selected sensors; and estimating fracture half-length and well productivity potential based on the extracted data.

In one aspect, one or more non-transitory machine-readable storage devices storing instructions for determining well productivity, the instructions being executable by one or more processing devices to cause performance of operations including acquiring measurement data from a plurality of in-situ sensors located within a hydraulically fractured subterranean formation; classifying the noise degree for sensors of the plurality based on the acquired measurement data; selecting sensors from the plurality by minimizing noise degree while maintaining coverage of the subterranean formation above a user defined threshold; extracting data from the selected sensors; and estimating fracture half-length and well productivity potential based on the extracted data.

Embodiments of these systems and methods can include one or more of the following features.

In some embodiments, the minimizing includes a mixed-integer programming framework.

In some embodiments, these aspects further include filtering measurement data from the plurality of in-situ sensors to remove noise from the measurement data, the filtering comprising artificial intelligence (AI) window filtering that is based on a radial basis function neural network.

In some embodiments, these aspects further include accessing, from a data store, data including at least one of rock property data, hydraulic fracturing parameter data, and sensor location data; combining the accessed data with the extracted data from the selected sensors; and estimating fracture half-length and well productivity potential based on the combined data.

In some embodiments, these aspects further include estimating a well productivity based on at least one of the estimated fracture half-length and well productivity potential, wherein the estimating includes a decline curve analysis. In some cases, the decline curve analysis includes a long short-term memory framework to predict declines in production based on a time-series of well productivity.

In some embodiments, these aspects further include monitoring a production well to determine well leakage based on the estimated well productivity and the measured production.

In some embodiments, estimating fracture half-length and well productivity potential is based on a pretrained XGBoost machine learning model.

In some embodiments, the measurement data include at least one of temperature, pressure, and chemical concentration.

In some embodiments, the in-situ sensors comprise an energy harvesting module to harvest vibrational energy.

In some embodiments, the in-situ sensors induce vibrations within fractures of the subterranean formation larger than microseismic events emitted by the fracture to improve detectability of microseismic events by geophones.

Certain implementations may have particular advantages. Vibration activated signals propagate better within earth layers making it easier to energize and activate the in-situ sensors. Introducing extra vibrations enhances the microseismic measurements leading to better fracture characterization and improves the detectability of the microseismic events.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 is an example flow diagram for determining well productivity.

Like reference symbols in the various drawings indicate like elements.

DETAILED DESCRIPTION

This specification describes systems and techniques for determining well productivity in hydraulically fractured wells. In-situ sensing devices of micrometer to millimeter size are pumped into fractures alongside proppants. The in-situ sensors are configured to monitor fracture extent and direction. The in-situ sensors are configured to induce in-situ vibrations within the well. The in-situ seismic vibrations are larger than the microseismic vibrations emitted by the fracture. Seismic sensors can better detect the larger in-situ seismic vibrations than the relatively smaller seismic vibrations emitted by the fracture. In-situ sensors are energized by a vibration source from the surface or the borehole and then activated to vibrate and act as micro-seismic sources within the fractures. A data processing system acquires data from the in-situ sensors, classifies the noise level of the data, optimizes sensor selection based on the noise classification and the coverage of the fractures, and estimates the fracture half-length and well productivity potential based on the data from the optimized selection of sensors. Further, the data processing system estimates overall well recovery using a decline curve analysis. The data processing system can monitor a production well and identify potential leakage based on the estimated well recovery and the measured production of the well.

Figure 1:
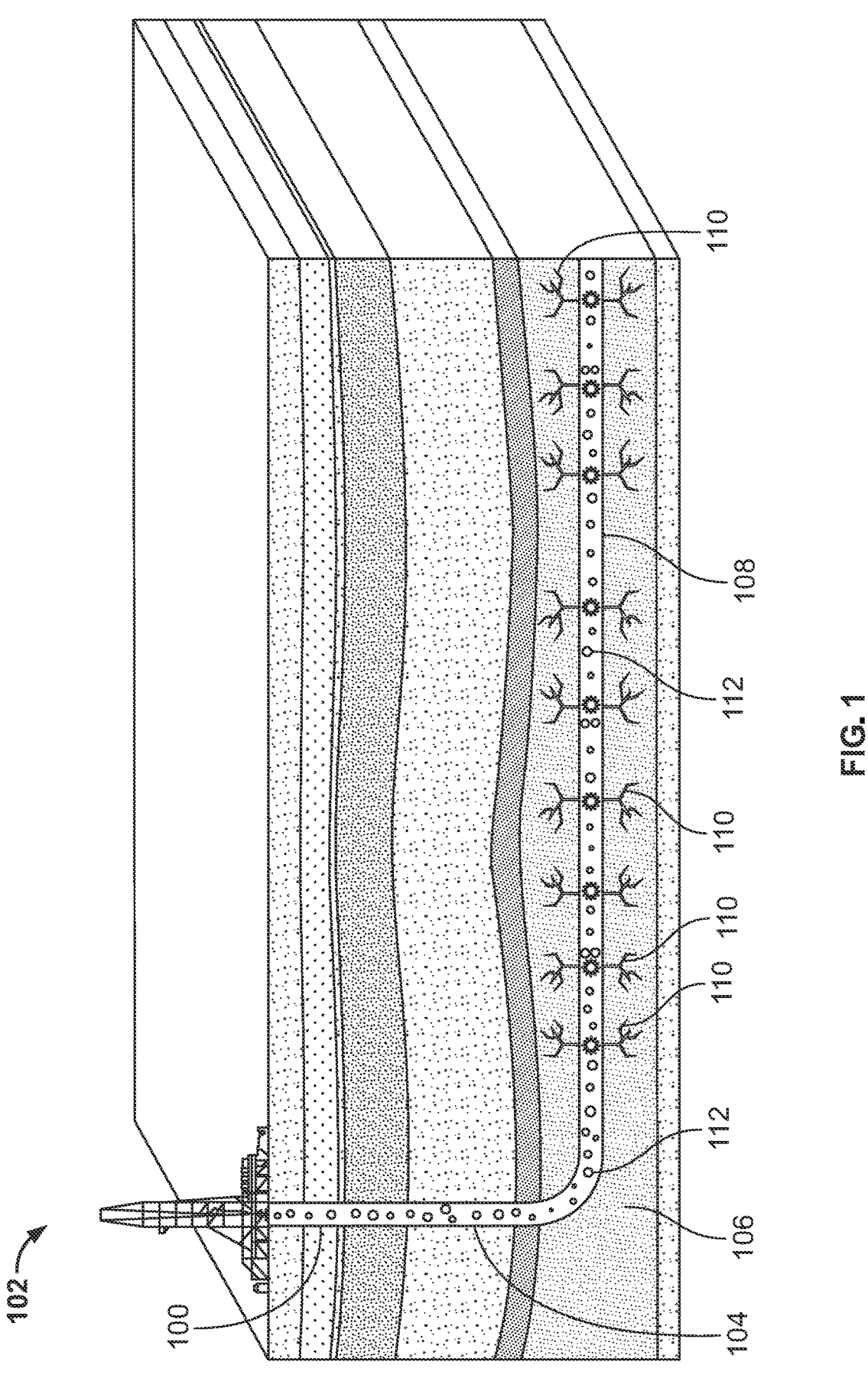
FIG. 1 is a schematic of a well with hydraulic fracturing.

FIG. 1 shows an example schematic of a well 100 in a subterranean formation 102. In this example, the well 100 has a vertical portion 104 extending vertically from the surface of the subterranean formation to a target reservoir formation 106 at a predetermined depth. The well 100 then turns and has a horizontal portion 108 extending for a predetermined length through the target reservoir formation 106.

Hydraulic fracturing is a well completion operation used to crack a target reservoir formation 106 via injection of high-pressure water to prepare the well 100 for production and improve the flow of hydrocarbons to the wellbore, for example, in low permeability formations. Fractures 110 are created by cracking or perforating the rocks in the target reservoir formation 106 along the horizontal portion 108 of the well 100. High-pressure water can then be pumped into the fractures 110 to enlarge the fracture width and extent. Once a target reservoir formation 106 is fractured, proppants 112 are pumped into these fractures 106 to keep them open after the hydraulic pressure is reduced.

Figure 2:
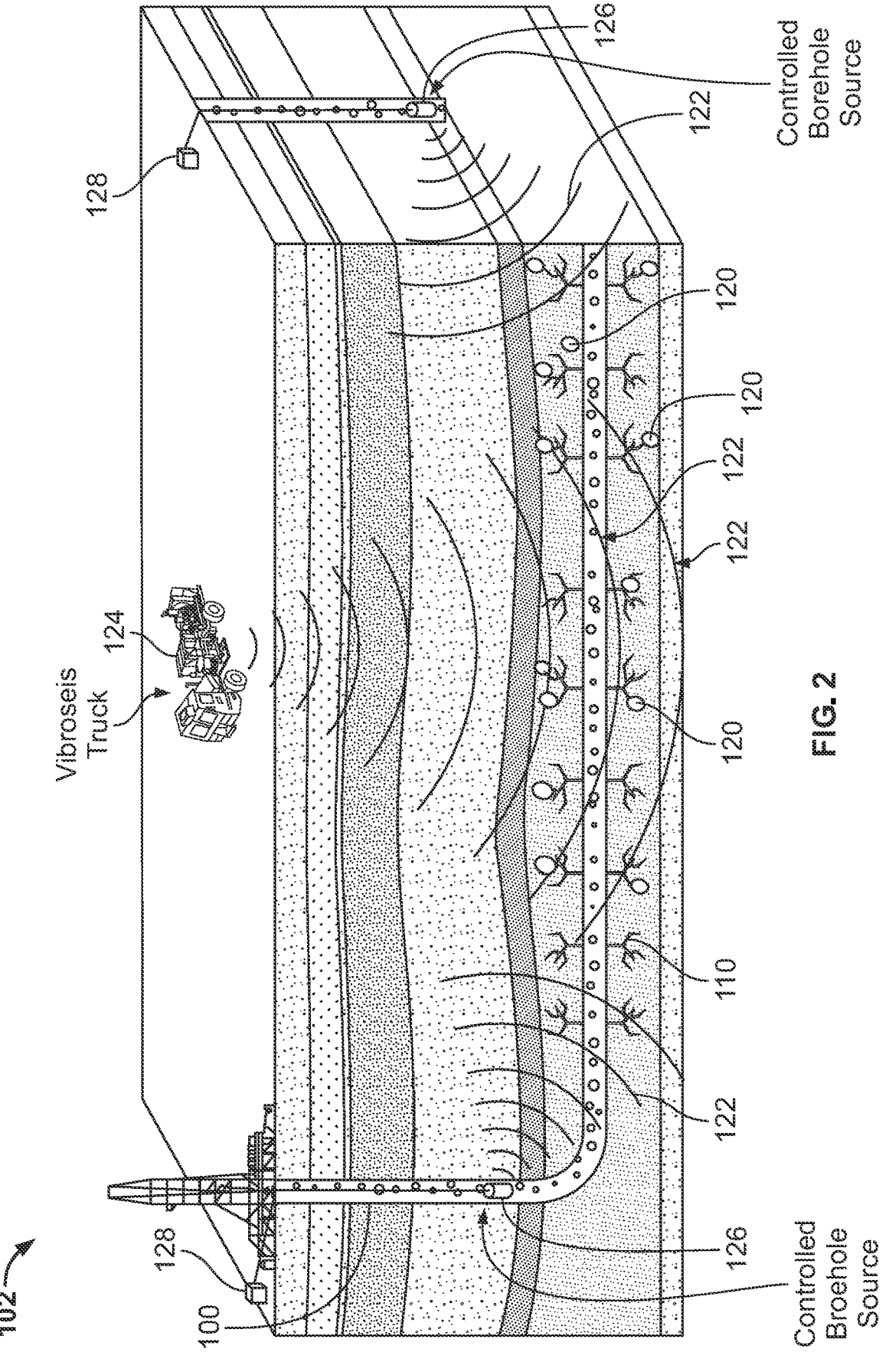
FIG. 2 is a schematic of a hydraulically fractured well with in-situ sensors.

FIG. 2 shows an example schematic of a well 100 where micrometer to millimeter sized in-situ sensors 120 have been pumped into the well 100 at the same time as the proppants 112 during a hydraulic fracturing completion. The in-situ sensors 120 enter the fractures 110 alongside the proppants 112. The in-situ sensors 120 aid in monitoring the facture extent and direction. The in-situ sensors are programmed to activate after sensing a pre-defined vibration pattern 122. In this example, the in-situ sensors 120 are activated by sending a pre-designed vibration pattern 122 into the subterranean formation 102. The pre-designed vibration pattern 122 can be generated on the surface by, for example, a vibroseis truck 124. In some implementations, the pre-designed vibration pattern 122 is generated from a controlled borehole source 126 that is connected to a control station 128. The controlled borehole source 126 is located in the same well 100 as the fracturing treatment. In other implementations, the controlled borehole source 126 is located in a nearby well 130 or in a lateral. In some implementations, the pre-designed vibration pattern 122 is provided by a combination of one or more of surface sources, such as vibroseis trucks 124, and controlled borehole sources 126.

Figure 3:
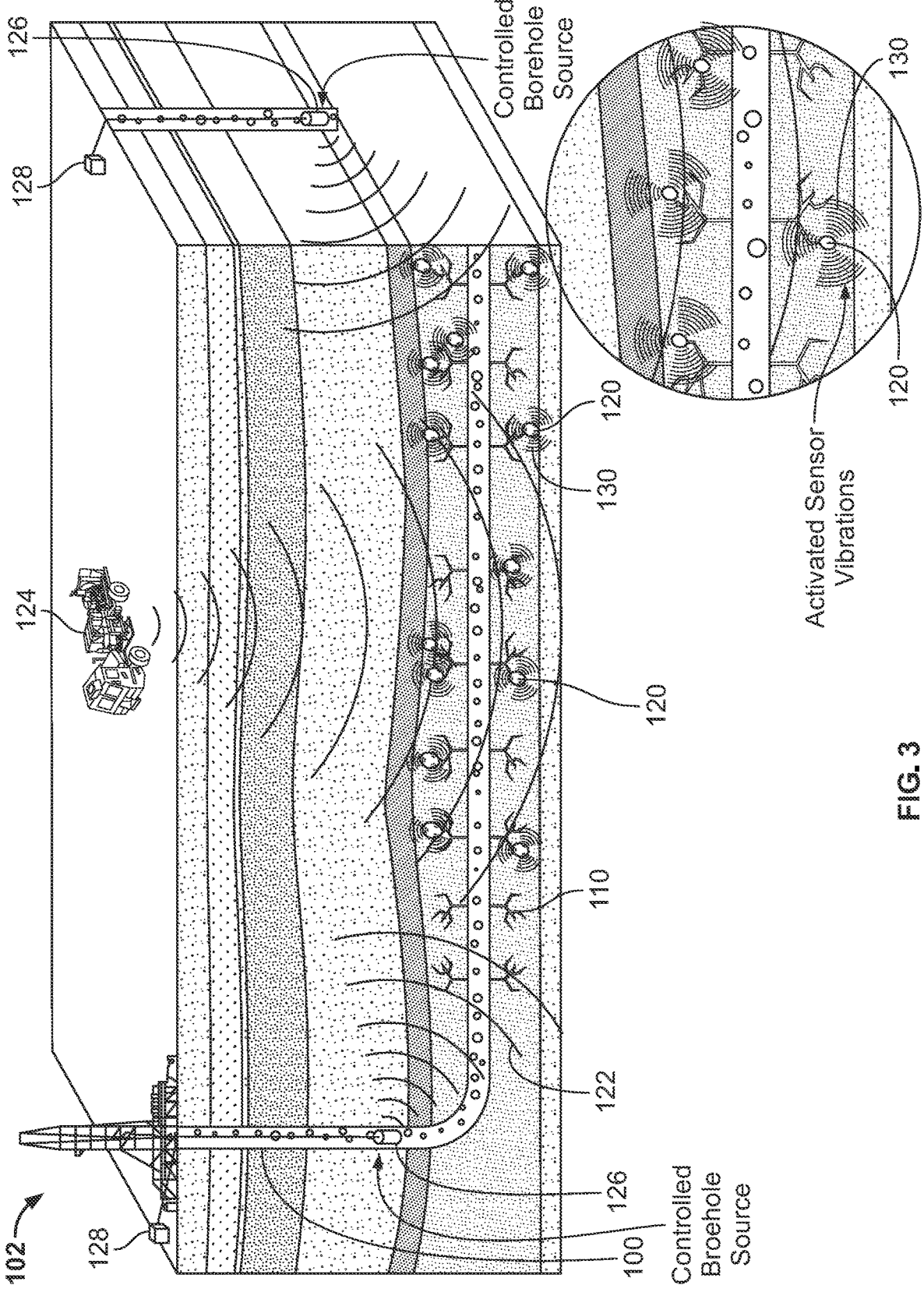
FIG. 3 is a schematic of the vibration of in-situ sensors in a hydraulically fractured well.

FIG. 3 shows an example schematic of the in-situ sensors 120 after activation. In some implementations, the in-situ sensors 120 can induce vibrations 130 within the fractures 110 in response to activation. Microseismic events can be measured by using surface and/or borehole geophones to enable further data analysis and mapping of fractures 110. The introduction of induced vibrations from the in-situ sensors 120 can improve detectability of more microseismic events to enhance the mapping of fractures 110.

Figure 4:
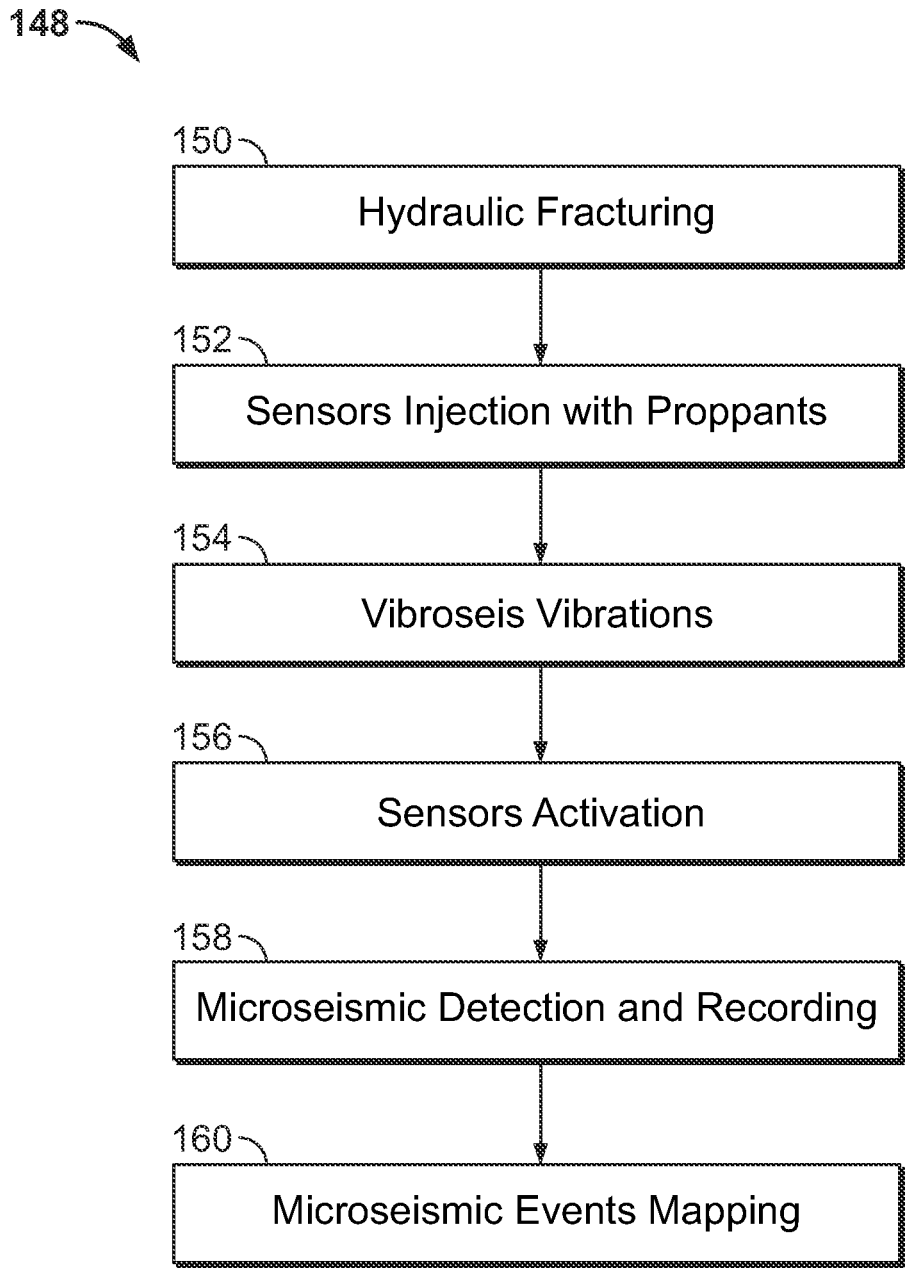
FIG. 4 is an example flow diagram for using in-situ sensors.

FIG. 4 shows a flow diagram for an example process 148 for mapping microseismic events using in-situ sensors 120 in a well undergoing hydraulic fracturing. A target reservoir formation is fractured through hydraulic fracturing (step 150). In-situ sensors 120 are injected into the well at the same time as the proppant (step 152). The in-situ sensors 120 are sized such that the in-situ sensors flow into the fractures 110 with the proppant 112. A pre-defined vibration pattern 122 is transmitted through the subsurface formation 102 by, for example, vibroseis (step 154). In this example, the pre-defined vibration pattern 122 is transmitted from the surface, from within the same well, from a nearby well, from a lateral or from a combination of these sources. The in-situ sensors 120 activate in response to sensing the pre-defined vibration pattern 122 (step 156). The in-situ sensors collect data from the formation such as pressure or temperature data. The number of in-situ sensors to map a fracture is dependent on the fracture size and the number of fractures in the subsurface formation. In an example implementation, a minimum of 3 in-situ sensors are needed for each fracture to enable inference of fracture length from temperature and pressure measurements. In some cases, the in-situ sensors induce vibrations 130 within the fractures 110 to improve detectability of microseismic events emitted by fractures 110. Microseismic events are detected and recorded by for example surface or borehole geophones (step 158).

A data processing system processes the recordings and detections from the surface and/or borehole geophones to map microseismic events (step 160). The data processing system maps fractures in the subsurface formation based on data collected from the in-situ sensors (e.g., temperature or pressure measurements). In some implementations, the data processing system integrates the fracture length inferred from the in-situ sensors with the fracture maps based on the recorded microseismic events.

FIG. 5 shows an example process 180 for determining well productivity potential using a plurality of in-situ sensors 120. A data processing system acquires data from the plurality of in-situ sensors 120 (step 182). The in-situ sensors wirelessly communicate and relay measurements to a base station installed in a borehole. The base station is communicatively linked to the data processing system where the acquired data are recorded. Examples of data that can be acquired from the plurality of in-situ sensors include measurements of pressure, temperature, flow rate, wireless transmission quality, or data quality between communicating sensors. The data processing system generates a log for each sensor that includes a data marker unique for each sensor. The base station includes a directional antenna, and the direction and strength of the wireless signal received from a sensor are recorded. The data processing system infers a location of a sensor relative to the base station based on the direction and strength of the wireless signal received. The data processing system integrates the data from the plurality of in-situ sensors into a deep learning framework for the assessment of the well productivity performance via optimizing the selection of sensor data. In some implementations, the data processing system pre-processes and denoises the sensor data based on an AI window filtering approach (step 184). The AI window filtering is based on a radial basis function (RBF) neural network sliding window approach that integrates a sliding window into the estimation of time series data. The data processing system selects parameters according to individual specifications of the expected noise level in the data. The data processing system determines the noise level from the data measurements and oscillations.

The data processing system quantifies the noise for sensors of the plurality based on the acquired data. For example, the data processing system quantifies the noise using a signal-to-noise ratio. The data processing system classifies the noise degree for each sensor using a pre-trained deep learning network to determine different degrees of measurement quality (step 186). For example, the data processing system classifies the sensor data into 1 of 10 classes of noise degree by assigning an integer value between 1 and 10 to each sensor representing the noise degree of the sensor, with 1 indicating perfect data quality (e.g., a very high signal-to-noise ratio) while a 10 can indicate very poor data quality (e.g., a very low signal-to-noise ratio). The deep learning network can be pre-trained on data from, for example, a lab or a simulation. The lab or simulation data can be time-series of measurements such as pressure, temperature, concentrations, or flow rate. The deep learning network can use an algorithm such as a random forest algorithm to classify the noise degree.

The data processing system selects sensors from the plurality by minimizing noise degree while maintaining coverage of the subterranean formation above a user defined threshold (step 188). In some implementations, the data processing system minimizes the effects of noise using the noise classification data in a mixed-integer programming framework while maintaining sufficient coverage of the formation. The coverage of the formation depends on the number of in-situ sensors in the formation, the physical distribution of the sensors in the formation, the data transmission between the sensors, and the data transmission from the sensors to a base station. The optimization framework integrates the degree of noise. For example, optimal sensors could have a noise degree above a threshold level (e.g., 8 on a scale from 1 to 10) and an average noise level below a certain value (e.g., 5 on a scale from 1 to 10). The threshold is a user selected value that is dependent on the formation and noise classification. In some implementations, an acceptable noise level for a selected sensor depends on the formation coverage by the plurality of sensors. For example, if a small number (e.g., less than 3) sensors are located within a region of the formation, a higher noise level for the sensor is acceptable to maintain coverage of the formation.

The data processing system extracts data from the in-situ sensors selected in the optimized sensor selection (step 190).

In some implementations, the data processing system can augment data from the optimized selection of in-situ sensors with additional data such as rock properties, hydraulic fracturing parameters, or sensor location to improve estimates of the fracture half-length and productivity potential (step 192).

The data processing system estimates the fracture half-length and productivity of the formation based on a pre-trained deep learning framework utilizing, for example, an XGBoost format that integrates the data from the optimized selection of in-situ sensors and any additional augmenting data (step 194). The deep learning network is trained using data including pressure and temperature measurements, data transmission quality and inter-sensor communication. Training data for the deep learning framework is obtained from lab measurements or manually labeled data from field measurements. In some implementations, the data processing system updates the deep learning model by training on previously classified data from in-situ sensors.

In some implementations, the data processing system estimates overall well recovery for the well based on at least one of the estimated fracture half-length and well productivity potential (step 196). In some implementations, the data processing system estimates overall well recovery based on a decline curve analysis. A decline curve analysis is a procedure for analyzing declining production rates and forecasting future performance of oil and gas wells. Oil and gas rates decline as a function of time because of, for example, loss of reservoir pressure or changing relative volumes of the produced fluids. In some implementations, the decline curve analysis is based on fitting a line to a performance history of the well based on an exponential decline, a hyperbolic decline, or a harmonic decline. In some implementations, the decline curve analysis is AI driven based on a long short-term memory (LSTM) framework to account for the temporal dynamics. The LSTM framework predicts future declines in production based on a time-series of well productivity.

In some implementations, the data processing system monitors a production well to determine potential well leakage based on the estimated overall well recovery and the measured production. In some implementations, the data processing system determines an overall well productivity based on the estimated well recovery. In some cases, the estimated well recovery is useful in business risk management by an oil and gas company.

Figure 6:
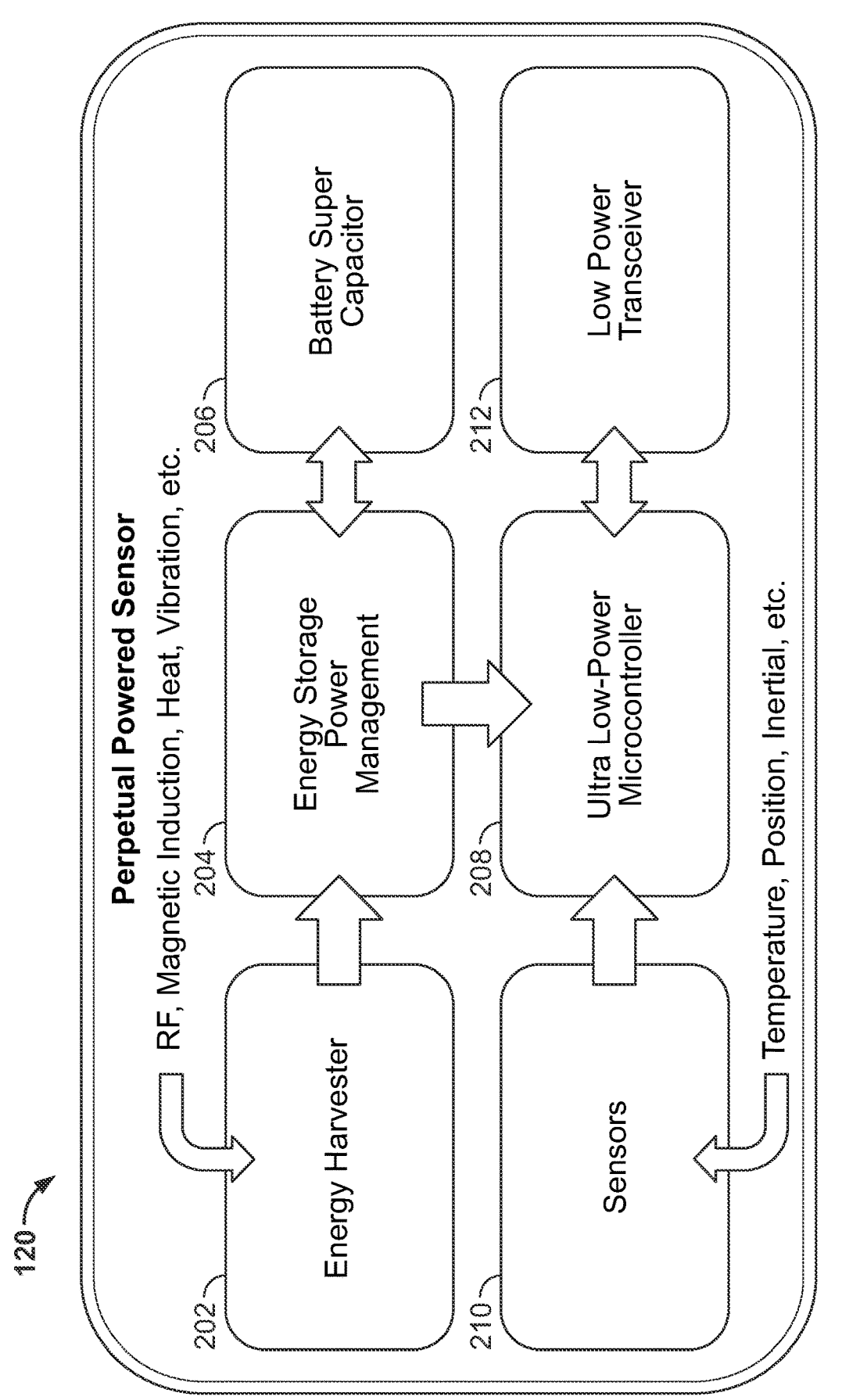
FIG. 6 is an example block diagram for an in-situ sensor.

FIG. 6 shows a block diagram for an example design of an in-situ sensor 120. The sensor can be perpetually powered from an external source. In this example, the sensor is configured with a customizable energy harvesting front-end component 202 that can harvest and respond to vibrational energy. The sensor can be equipped with an energy storage and power management module 204. The energy storage and power management module 204 works independently from other processors in the sensor. An energy storage element 206 such as a battery or a super capacitor can store vibrational energy harvested from the energy harvesting front-end component 202. Once the minimum energy requirements are stored in the energy storage element 206, the energy storage and power management module 202 can continuously indicate the energy levels allowing the sensor to execute the data acquisition, update memory and transmit readings to another in-situ sensor. The in-situ sensor can have a microcontroller 208 such as an ultra-low-power microcontroller. The microcontroller 208 interfaces between the energy storage and power management module 202, on board sensors 210 such as temperature sensors, position sensors, pressure sensor or flow rate sensors, and a low power transceiver 212. The transceiver uses a magnetic induction (MI) technique to overcome the environmental conditions of the subsurface formation.

Figure 7:
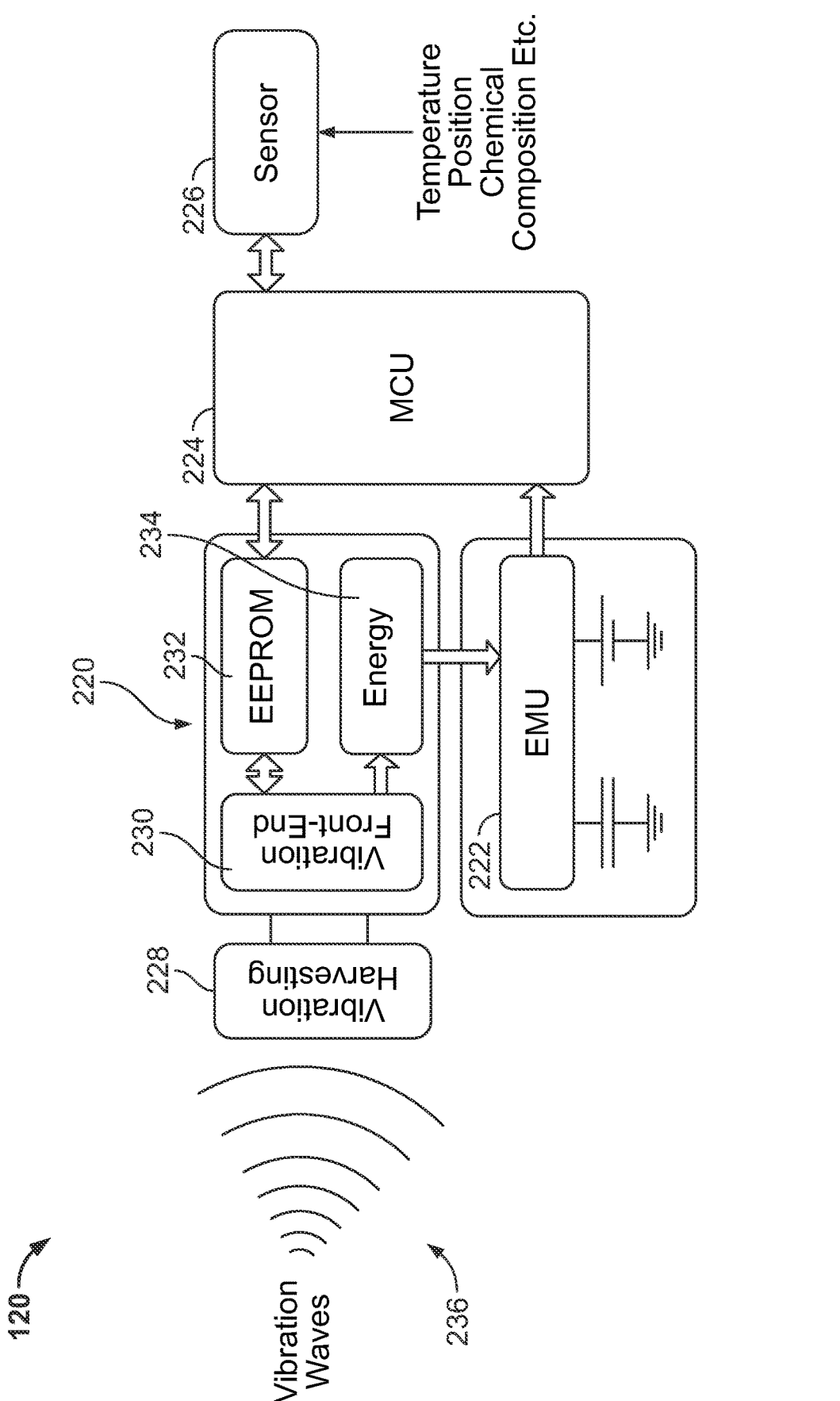
FIG. 7 is an example block diagram of the architecture for an in-situ sensor.

FIG. 7 shows an example architecture of an in-situ sensor 120. The in-situ sensor comprises a harvesting circuit 220, an energy management unit (EMU) 222, a microcontroller unit (MCU) 224, and a sensor unit 226. The harvesting circuit 220 comprises a vibration harvesting module 228, a vibration front end 230, a memory element 232, and an energy storage element 234. The vibration harvesting module 228 can harvest energy from vibrational waves 236 originating from the surface of the formation or from borehole sources to activate and energize the in-situ sensor 120. The vibration harvesting module 228 is electrically connected to the vibration front-end 230. The vibration front-end 230 allows for control and energy harvesting from induced vibration waves. The vibration front-end 230 is electrically connected to a memory element 232. The memory element 230 can be a read-only memory such as EEPROM. The vibration front-end 230 is also connected to an energy storage element 234 such as a battery or a super capacitor. The energy storage element 234 is electrically connected to the energy management unit (EMU) 222. Once the harvesting circuit 220 collects the minimum energy requirements in the energy storage element 234 to operate the in-situ sensor 120, the EMU 222 can indicate continuously the energy levels allowing the in-situ sensor 120 to execute the data acquisition, update memory, and transmit the readings to the next in-situ sensor. The MCU 224 is electrically connected to the EMU 222, the harvesting circuit 220, and the sensor unit 226. The MCU 224 oversees the operations of the in-situ sensor 120 controlling all components and communicating with other in-situ sensors. The MCU 224 can be an ultra-low power microcontroller. The sensor unit 226 includes the sensors to take measurements of the formation. For example, quantities that can be measured by the sensor unit can include temperature, pressure, position, and chemical composition. These in-situ sensors 120 can be disposable and can be left in hydraulic fractures similar to proppants.

Figure 8:
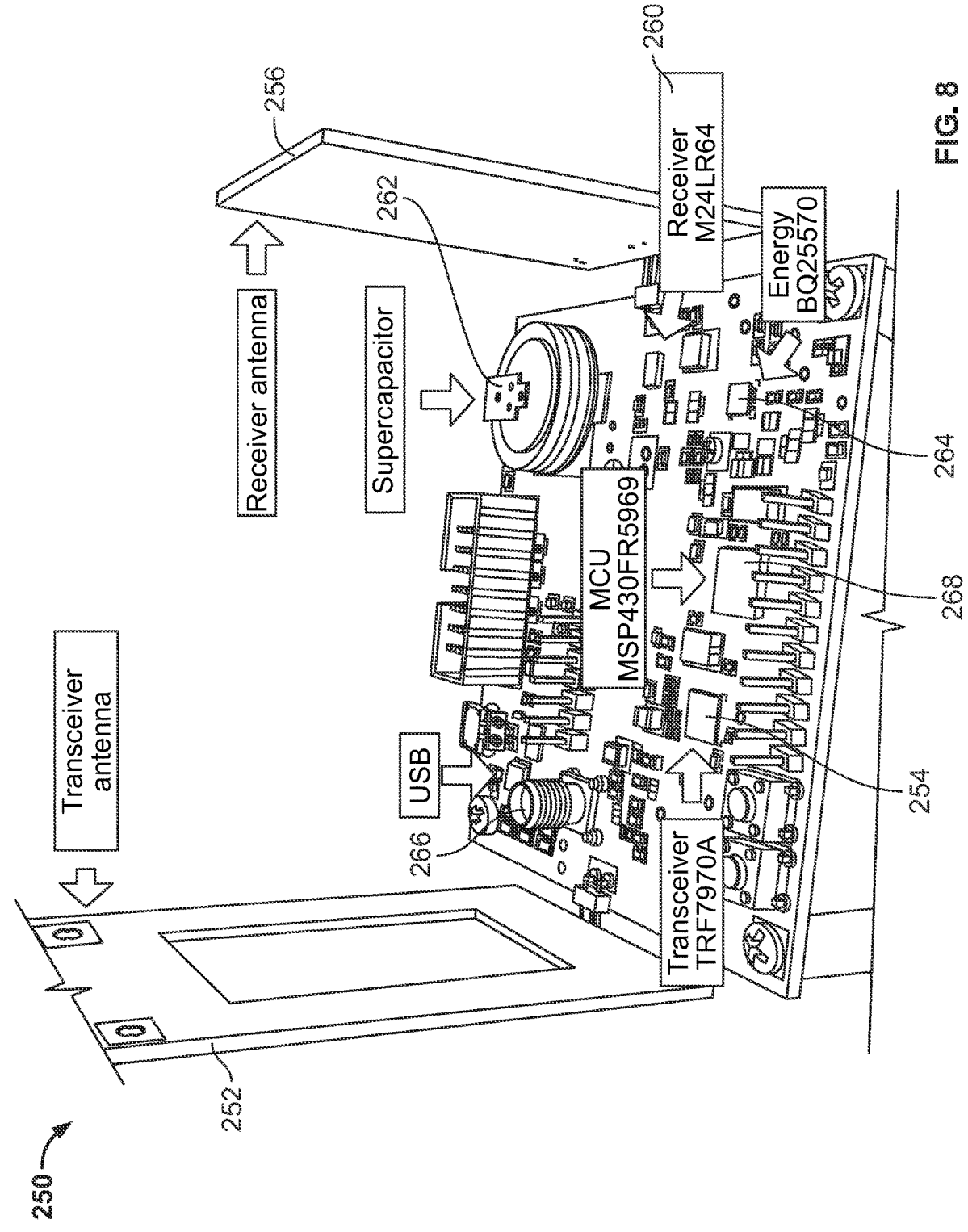
FIG. 8 shows a prototype in-situ sensor.

FIG. 8 illustrates an example prototype 250 of an in-situ sensor. The prototype has a transceiver antenna 252, a transceiver (TRF7970A) 254, a receiver antenna 256, and a receiver (M24LR64) 260 for communication with other in-situ sensors. Energy storage for the in-situ sensor is provided by a supercapacitor 262. The EMU 264 includes a nanopower management chip (BQ25570). The prototype also has a USB interface 266. The MCU (MSP430FR5969) 268 is a holistic ultra-low-power system architecture for low energy budgets. The enhanced energy features of the MCU 268 enable energy optimization through a low power mode. Advanced timer features of the MCU 268 allow the MCU to operate with minimum energy requirements during sleep mode with an automatic wake up system using a watchdog timer.

Figure 9:
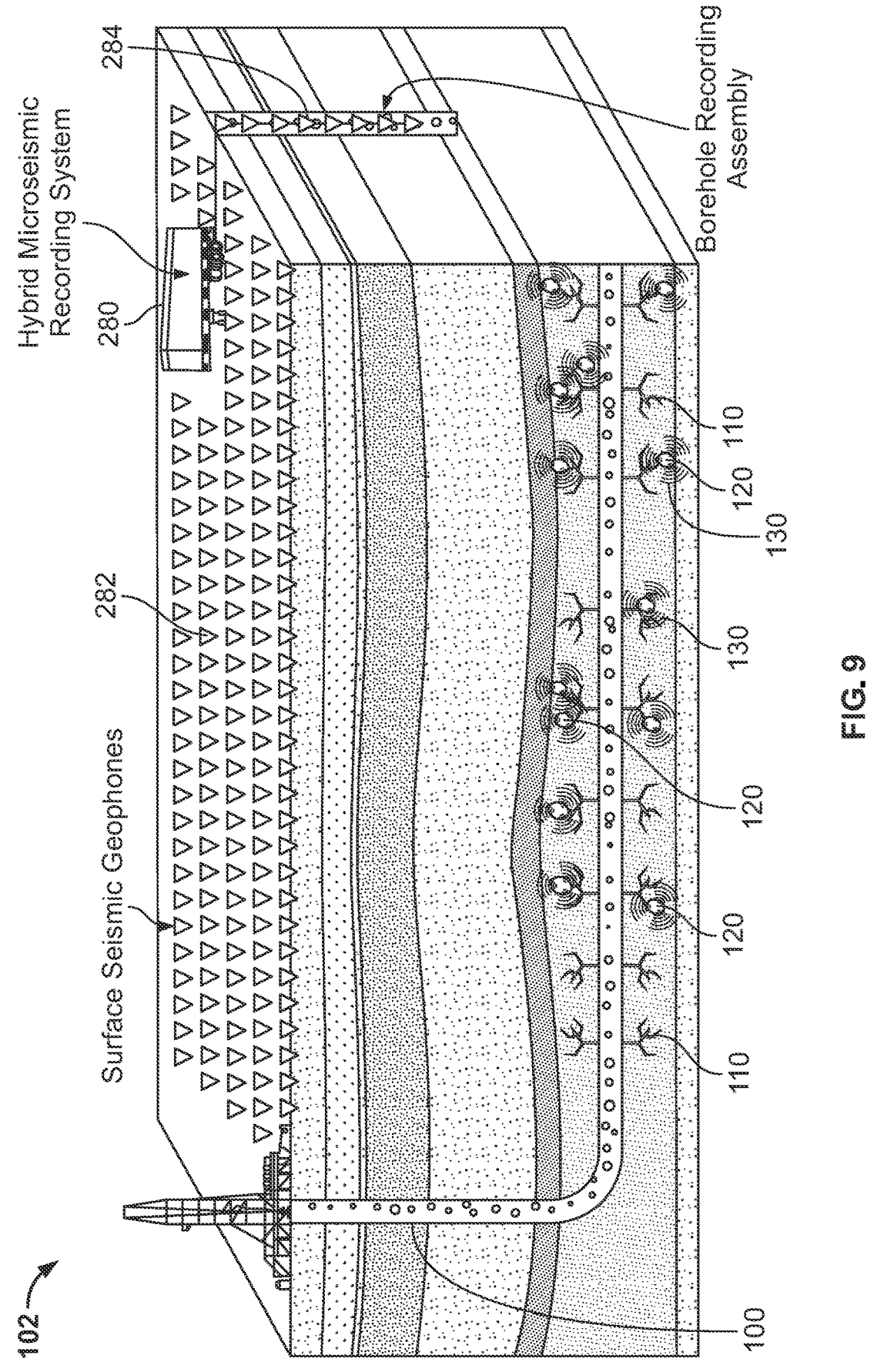
FIG. 9 shows a schematic of an example hybrid approach for monitoring a hydraulically fractured well.

FIG. 9 is a schematic of an example hybrid system for recording microseismic events 280. In-situ sensors 120 are pumped into a well 100 that is undergoing hydraulic fracturing at the same time as proppant. The in-situ sensors 120 are activated by a pre-defined pattern of vibrations. After activation, the in-situ sensors 120 induce vibrations 130 within the fractures that can enhance the detectability of microseismic events emitted by the fractures 110. An array of surface seismic geophones 282 can be distributed across the surface of a subterranean formation 102 to detect microseismic events. A hybrid microseismic recording system 280 is connected to the array of surface seismic geophones 282 and a borehole recording assembly 284 in a nearby well to record the events detected by the surface seismic geophones 282 and the borehole recording assembly 284.

Figure 10:
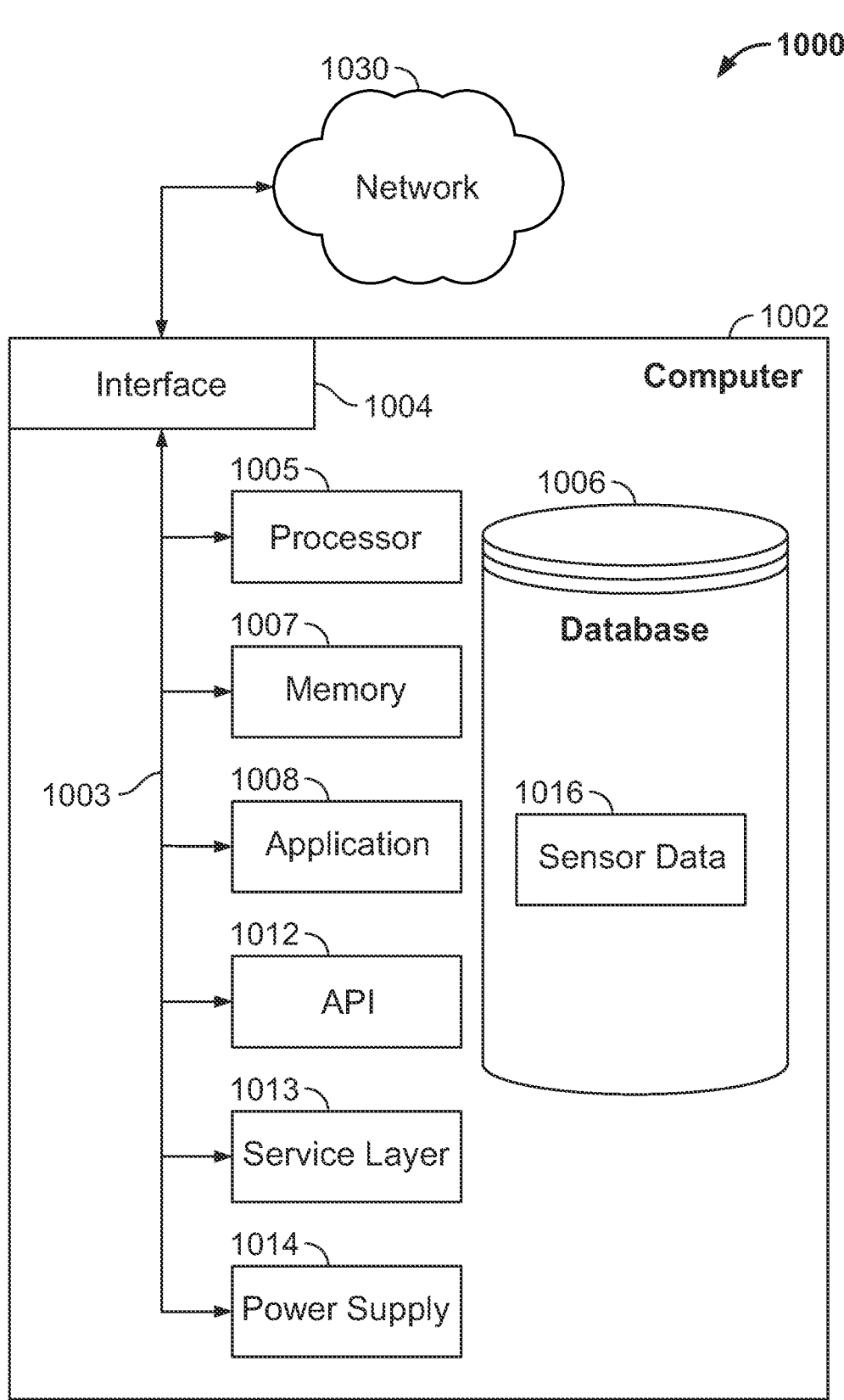
FIG. 10 is a block diagram illustrating an example computer system used to provide computational functionalities associated with described algorithms, methods, functions, processes, flows, and procedures according to some implementations of the present disclosure.

FIG. 10 is a block diagram of an example computer system 1000 used to provide computational functionalities associated with described algorithms, methods, functions, processes, flows, and procedures described in the present disclosure, according to some implementations of the present disclosure. The illustrated computer 1002 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1002 can include input devices such as keypads, keyboards, and touch screens that can accept user information. Also, the computer 1002 can include output devices that can convey information associated with the operation of the computer 1002. The information can include digital data, visual data, audio information, or a combination of information. The information can be presented in a graphical user interface (UI) (or GUI).

The computer 1002 can serve in a role as a client, a network component, a server, a database, a persistency, or components of a computer system for performing the subject matter described in the present disclosure. The illustrated computer 1002 is communicably coupled with a network 1030. In some implementations, one or more components of the computer 1002 can be configured to operate within different environments, including cloud-computing-based environments, local environments, global environments, and combinations of environments.

At a high level, the computer 1002 is an electronic computing device operable to receive, transmit, process, store, and manage data and information associated with the described subject matter. According to some implementations, the computer 1002 can also include, or be communicably coupled with, an application server, an email server, a web server, a caching server, a streaming data server, or a combination of servers.

The computer 1002 can receive requests over network 1030 from a client application (for example, executing on another computer 1002). The computer 1002 can respond to the received requests by processing the received requests using software applications. Requests can also be sent to the computer 1002 from internal users (for example, from a command console), external (or third) parties, automated applications, entities, individuals, systems, and computers.

Each of the components of the computer 1002 can communicate using a system bus 1003. In some implementations, any or all of the components of the computer 1002, including hardware or software components, can interface with each other or the interface 1004 (or a combination of both), over the system bus 1003. Interfaces can use an application programming interface (API) 1012, a service layer 1013, or a combination of the API 1012 and service layer 1013. The API 1012 can include specifications for routines, data structures, and object classes. The API 1012 can be either computer-language independent or dependent. The API 1012 can refer to a complete interface, a single function, or a set of APIs.

The service layer 1013 can provide software services to the computer 1002 and other components (whether illustrated or not) that are communicably coupled to the computer 1002. The functionality of the computer 1002 can be accessible for all service consumers using this service layer. Software services, such as those provided by the service layer 1013, can provide reusable, defined functionalities through a defined interface. For example, the interface can be software written in JAVA, C++, or a language providing data in extensible markup language (XML) format. While illustrated as an integrated component of the computer 1002, in alternative implementations, the API 1012 or the service layer 1013 can be stand-alone components in relation to other components of the computer 1002 and other components communicably coupled to the computer 1002. Moreover, any or all parts of the API 1012 or the service layer 1013 can be implemented as child or sub-modules of another software module, enterprise application, or hardware module without departing from the scope of the present disclosure.

The computer 1002 includes an interface 1004. Although illustrated as a single interface 1004 in FIG. 10, two or more interfaces 1004 can be used according to particular needs, desires, or particular implementations of the computer 1002 and the described functionality. The interface 1004 can be used by the computer 1002 for communicating with other systems that are connected to the network 1030 (whether illustrated or not) in a distributed environment. Generally, the interface 1004 can include, or be implemented using, logic encoded in software or hardware (or a combination of software and hardware) operable to communicate with the network 1030. More specifically, the interface 1004 can include software supporting one or more communication protocols associated with communications. As such, the network 1030 or the interface's hardware can be operable to communicate physical signals within and outside of the illustrated computer 1002.

The computer 1002 includes a processor 1005. Although illustrated as a single processor 1005 in FIG. 10, two or more processors 1005 can be used according to particular needs, desires, or particular implementations of the computer 1002 and the described functionality. Generally, the processor 1005 can execute instructions and can manipulate data to perform the operations of the computer 1002, including operations using algorithms, methods, functions, processes, flows, and procedures as described in the present disclosure.

The computer 1002 also includes a database 1006 that can hold data for the computer 1002 and other components connected to the network 1030 (whether illustrated or not). For example, database 1006 can be an in-memory, conventional, or a database storing data consistent with the present disclosure. In some implementations, database 1006 can be a combination of two or more different database types (for example, hybrid in-memory and conventional databases) according to particular needs, desires, or particular implementations of the computer 1002 and the described functionality. Although illustrated as a single database 1006 in FIG. 10, two or more databases (of the same, different, or combination of types) can be used according to particular needs, desires, or particular implementations of the computer 1002 and the described functionality. While database 1006 is illustrated as an internal component of the computer 1002, in alternative implementations, database 1006 can be external to the computer 1002.

The computer 1002 also includes a memory 1007 that can hold data for the computer 1002 or a combination of components connected to the network 1030 (whether illustrated or not). Memory 1007 can store any data consistent with the present disclosure. In some implementations, memory 1007 can be a combination of two or more different types of memory (for example, a combination of semiconductor and magnetic storage) according to particular needs, desires, or particular implementations of the computer 1002 and the described functionality. Although illustrated as a single memory 1007 in FIG. 10, two or more memories 1007 (of the same, different, or combination of types) can be used according to particular needs, desires, or particular implementations of the computer 1002 and the described functionality. While memory 1007 is illustrated as an internal component of the computer 1002, in alternative implementations, memory 1007 can be external to the computer 1002.

The application 1008 can be an algorithmic software engine providing functionality according to particular needs, desires, or particular implementations of the computer 1002 and the described functionality. For example, application 1008 can serve as one or more components, modules, or applications. Further, although illustrated as a single application 1008, the application 1008 can be implemented as multiple applications 1008 on the computer 1002. In addition, although illustrated as internal to the computer 1002, in alternative implementations, the application 1008 can be external to the computer 1002.

The computer 1002 can also include a power supply 1014. The power supply 1014 can include a rechargeable or non-rechargeable battery that can be configured to be either user- or non-user-replaceable. In some implementations, the power supply 1014 can include power-conversion and management circuits, including recharging, standby, and power management functionalities. In some implementations, the power-supply 1014 can include a power plug to allow the computer 1002 to be plugged into a wall socket or a power source to, for example, power the computer 1002 or recharge a rechargeable battery.

There can be any number of computers 1002 associated with, or external to, a computer system containing computer 1002, with each computer 1002 communicating over network 1030. Further, the terms "client," "user," and other appropriate terminology can be used interchangeably, as appropriate, without departing from the scope of the present disclosure. Moreover, the present disclosure contemplates that many users can use one computer 1002 and one user can use multiple computers 1002.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of the invention have been described. Nevertheless, it will be understood that various modifications may be made without departing from the spirit and scope of the invention. Accordingly, other embodiments are within the scope of the following claims.

What is claimed is:

1. A method for determining well productivity, the method comprising:

acquiring measurement data from a plurality of in-situ sensors located within fractures in a hydraulically fractured well in a subterranean formation;

classifying a noise degree for sensors of the plurality, the noise degree representing a quality of the acquired measurement data from the sensors of the plurality;

reducing effects of noise in the measurement data while maintaining coverage of the fractures above a threshold by selecting sensors from the plurality based on the noise degree classification and based on a physical distribution of the in-situ sensors in the fractures;

extracting data from the selected sensors having the physical distribution and having the noise degree satisfying the threshold; and estimating fracture half-length and well productivity potential based on the extracted data.

2. The method of claim 1, wherein the minimizing comprises a mixed-integer programming framework.

3. The method of claim 1, further comprising: filtering measurement data from the plurality of in-situ sensors to remove noise from the measurement data, the filtering comprising artificial intelligence (AI) window filtering that is based on a radial basis function neural network.

4. The method of claim 1, further comprising: accessing, from a data store, data comprising at least one of rock property data, hydraulic fracturing parameter data, and sensor location data; combining the accessed data with the extracted data from the selected sensors; and estimating fracture half-length and well productivity potential based on the combined data.

5. The method of claim 1, further comprising: estimating a well productivity based on at least one of the estimated fracture half-length and well productivity potential, wherein the estimating comprises a decline curve analysis.

6. The method of claim 5, wherein the decline curve analysis comprises a long short-term memory framework to predict declines in production based on a time-series of well productivity.

7. The method of claim 5, further comprising: monitoring a production well to determine well leakage based on the estimated well productivity and the measured production.

8. The method of claim 1, wherein estimating fracture half-length and well productivity potential is based on a pretrained XGBoost machine learning model.

9. The method of claim 1, wherein the measurement data include at least one of temperature, pressure, and chemical concentration.

10. A system for estimating well productivity, the system comprising:
  a plurality of in-situ sensors;
  a base station;
  at least one processor; and
  a memory storing instructions that when executed by the at least one processor cause the at least one processor to perform operations comprising:
    acquiring measurement data from the plurality of in-situ sensors located within fractures in a hydraulically fractured well in a subterranean formation;
    classifying a noise degree for sensors of the plurality, the noise degree representing a quality of the acquired measurement data from the sensors of the plurality;
    reducing effects of noise in the measurement data while maintaining coverage of the fractures above a threshold by selecting sensors from the plurality based on the noise degree classification and based on a physical distribution of the in-situ sensors in the fractures;
    extracting data from the selected sensors having the physical distribution and having the noise degree satisfying the threshold; and
    estimating fracture half-length and well productivity potential based on the extracted data.

11. The system of claim 10, wherein the in-situ sensors comprise an energy harvesting module to harvest vibrational energy.

12. The system of claim 10, wherein the in-situ sensors induce vibrations within fractures of the subterranean formation larger than microseismic events emitted by the fracture to improve detectability of microseismic events by geophones.

13. The system of claim 10, the operations further comprising:
  filtering measurement data from the plurality of in-situ sensors to remove noise from the measurement data, the filtering comprising artificial intelligence (AI) window filtering that is based on a radial basis function neural network.

14. The system of claim 10, the operations further comprising:
  estimating a well productivity based on at least one of the estimated fracture half-length and well productivity potential, wherein the estimating comprises a decline curve analysis comprising a long short-term memory framework to predict declines in production based on a time-series of well productivity.

15. The system of claim 10, wherein estimating fracture half-length and well productivity potential is based on a pretrained XGBoost machine learning model.

16. One or more non-transitory machine-readable storage devices storing instructions for determining well productivity, the instructions being executable by one or more processing devices to cause performance of operations comprising:
  acquiring measurement data from a plurality of in-situ sensors located within fractures in a hydraulically fractured well in a subterranean formation;
  classifying a noise degree for sensors of the plurality, the noise degree representing a quality of the acquired measurement data from the sensors of the plurality;
  reducing effects of noise in the measurement data while maintaining coverage of the fractures above a threshold by selecting sensors from the plurality based on the noise degree classification and based on a physical distribution of the in-situ sensors in the fractures;
  extracting data from the selected sensors having the physical distribution and having the noise degree satisfying the threshold; and
  estimating fracture half-length and well productivity potential based on the extracted data.

17. The non-transitory machine-readable storage devices of claim 16, the operations further comprising:
  filtering measurement data from the plurality of in-situ sensors to remove noise from the measurement data, the filtering comprising artificial intelligence (AI) window filtering that is based on a radial basis function neural network.

18. The non-transitory machine-readable storage devices of claim 16, the operations further comprising:
  estimating a well productivity based on at least one of the estimated fracture half-length and well productivity potential, wherein the estimating comprises a decline curve analysis comprising a long short-term memory framework to predict declines in production based on a time-series of well productivity.

19. The non-transitory machine-readable storage devices of claim 18, the operations further comprising:
  monitoring a production well to determine well leakage based on the estimated well productivity and the measured production.

20. The non-transitory machine-readable storage devices of claim 16, wherein estimating fracture half-length and well productivity potential is based on a pretrained XGBoost machine learning model.

* * * * *